United States Patent
Prakash et al.

(10) Patent No.: US 6,660,122 B1
(45) Date of Patent: Dec. 9, 2003

(54) INDUCTION CURABLE TIRE COMPONENTS AND METHODS OF SELECTIVELY CURING SUCH COMPONENTS

(75) Inventors: Amit Prakash, Hudson, OH (US); David Thomas Reese, Norton, OH (US); Frederick Forbes Vannan, Jr., Clinton, OH (US); Terry Kenneth Woods, Canton, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/786,619

(22) PCT Filed: Sep. 4, 1998

(86) PCT No.: PCT/US98/18520

§ 371 (c)(1),
(2), (4) Date: May 14, 2001

(87) PCT Pub. No.: WO00/13883

PCT Pub. Date: Mar. 16, 2000

(51) Int. Cl.[7] .................. B29D 30/00; B29C 35/08
(52) U.S. Cl. .................. 156/272.4; 152/458; 152/525; 152/541; 156/130.5; 156/273.3; 264/487
(58) Field of Search ................. 156/96, 110.1, 156/123, 130.5, 272.4, 273.3; 152/458, 209.4, 525, 541; 264/486, 487; 219/634, 645

(56) References Cited

U.S. PATENT DOCUMENTS

| | | | | |
|---|---|---|---|---|
| 2,393,541 A | * | 1/1946 | Kohler | 219/634 |
| 3,095,026 A | * | 6/1963 | Weber | 152/458 |
| 3,592,954 A | * | 7/1971 | Widdowson | 152/458 |
| 3,599,696 A | * | 8/1971 | Hartz | 152/458 |
| 3,620,876 A | | 11/1971 | Guglielmo, Sr. et al. | 156/272 |
| 3,705,284 A | | 12/1972 | Binard | 219/10.49 |
| 3,709,775 A | | 1/1973 | James | 161/162 |
| 3,802,985 A | * | 4/1974 | Leatherman | 264/486 |
| 3,933,566 A | | 1/1976 | Seiberling | 156/272 |
| 4,089,360 A | * | 5/1978 | Böhm | 156/123 |
| 4,624,798 A | | 11/1986 | Gindrup et al. | 252/62.54 |
| 5,087,804 A | | 2/1992 | McGaffigan | 219/10.43 |
| 5,322,901 A | | 6/1994 | Kato | 525/232 |
| 5,483,043 A | | 1/1996 | Sturman, Jr. et al. | 219/647 |
| 5,513,683 A | * | 5/1996 | Causa et al. | 152/209.4 |
| 5,529,708 A | | 6/1996 | Palmgren et al. | 252/62.54 |
| 5,591,369 A | | 1/1997 | Matsen et al. | 219/633 |

FOREIGN PATENT DOCUMENTS

| | | |
|---|---|---|
| DE | 44 20 198 A1 | 12/1995 |
| DE | 196 24 766 A1 | 1/1998 |
| EP | 0 183 450 | 6/1986 |
| EP | 0503794 | 9/1992 |
| EP | 0 640 470 A2 | 3/1995 |
| EP | 0 661 149 A2 | 7/1995 |
| FR | 2224286 | 10/1974 |
| JP | 986216289 | 8/1996 |

OTHER PUBLICATIONS

Patent Abstracts of Japan, vol. 098, Aug. 31, 1998 & JP 10 128764 A (Sumitomo Rubber Ind Ltd), May 19, 1998.
Database WPI, Section Ch, Week 9809 Mar. 1998 Derwent Publications Ltd, London, GB; Class A35, AN 98–090072'09! XP002102531 & JP 09 207241 A (Sumitomo Rubber Ind Ltd), Aug. 12, 1997.

* cited by examiner

Primary Examiner—Geoffrey L. Knable
(74) Attorney, Agent, or Firm—David L. King

(57) ABSTRACT

A rubber tire component (10, 20, 30, 40) is laden with a mixture of fibers (12). The fibers (12) being sensitive to induction heating can be rapidly cured using a variety of methods. The preferred method permits a selective induction curing of the fiber laden component (10, 20, 30, 40) in combination with conventional curing presses.

2 Claims, 3 Drawing Sheets

INDUCTION CURABLE TIRE COMPONENTS AND METHODS OF SELECTIVELY CURING SUCH COMPONENTS

TECHNICAL FIELD

This invention relates to the vulcanization and bonding of tire components, more particularly it relates to the use of induction heating to assist in the curing or bonding of said tire components.

BACKGROUND ART

Generally tires are cured in a process known as vulcanization whereby elastomeric material is heated in molds. The heated molds are generally conductive in nature and transfer heat from the surface of the tire to the internal components requiring a fixed amount of time at a given temperature in order to achieve full complete curing of the tire.

Rubber or elastomeric material is not an effective conductive material and acts as somewhat of an insulator. Therefore, for a complete curing of a tire to occur, many of the components are over cooked or exposed to a larger amount of heat than normally would be required if the tire would quickly and uniformly achieve curing temperature. Due to the various time lengths involved in the curing process to bring all of the material up to curing temperature the vulcanization process requires many minutes to completely cure a tire. In European patent publication 0183450A2, Anthony James Sumner devised a mold which would permit a tire to be cured using electric current which may be induced electromagnetically. The mold itself had a variety of insulating segments and side plates which permitted varying amounts of conductive heat to be applied to the mold in such a fashion that selective regions of the tire could achieve more heat in such areas where the tread and bead are thicker. The mold itself was a rather complicated structure which did permit an electromagnetic curing of the entire tire structure. The mold however provided the selective curing capability of the tire for thick and thin regions.

In U.S. Pat. No. 5,483,043 assigned to General Electric Company, inducting heat of polymer matrix composites mold press was disclosed wherein electrically conductive fibers were added to the polymer matrix to facilitate the induction heating of the polymer. This patent deals with polymeric matrix that generally fall into two classes, thermosetting and thermoplastic which are fiber loaded. Examples of materials typically for reinforcing fibers include carbon graphite, barons, and silicone carbide. It is believed that the polymeric components manufactured under General Electric Company's patent related to the aircraft industry and did not include nor encompass rubber tire components.

In a Japanese patent application more relevant to the rubber industry Patent No. JP8216289A discloses a method of retreading tires using high frequency waves to vulcanize the adhesive layer incorporating the base tire with the reheating member. In this patent the steel cords in the belt layers are heated by activating or inducing an inductive heating coil which heats the steel cords and in turn provides a heat source for the curing of the cushion gum used in the retreading of the tire. While this method of using induction heating provides the use of the tire cords as the inductively heated metal component it is recognized that such cords have limited surface area and the heat transfer is rather localized around the belt cords.

The most relevant patent is Japanese Patent Publication 128764 which recites a method of curing a tire component using the steps as recited in the preamble of claims 1 and 6, the portions thereafter the characterizing clause represents the novel features of the present invention. The dependent claims describe features of the preferred embodiments of the invention.

In document JP 09 207241 a cushion gum is described having a magnetic powder of 5 parts by weight or more for use in retreading tires.

It is an object of the present invention to find a uniform dispersal of fibers susceptible to inductive heating throughout a tire component so that the tire can be selectively cured. It is a further object of the invention to provide a preformed rubber component having fibers which are susceptible to inductive heating that will permit the tire to be more rapidly cured when used in combination with conventional curing methods.

SUMMARY OF THE INVENTION

A method of selectively curing tire components (10, 20, 30 40) has the steps dispersing of plurality of metal particles (12) or short fibers (12) into a rubber composition (14). Preferably, the dispersion of the plurality of metal particles (12) or short fibers (12) into a rubber composition (14) includes the step of a extruding the material while blending in the fibers (12) or metal particles (12).

The fiber loaded rubber composition is then preshaped into a tire component (10, 20, 30, or 40) of a predetermined cross-section. Then the tire component can be placed in an induction heating coil and the heating coil can be activated thereby internally curing the tire component while maintaining the external surfaces of the tire component partially or completely uncured.

In order to achieve this selective curing of tire components, it is further contemplated that one would preselect a time and energy profile for a particular tire component to insure the external components remain at least initially uncured while the interior of the tire component is cured.

Several alternative methods of selectively curing tire components (10, 20, 30, or 40) further have the steps of placing the preshaped tire component with fiber or metal particles (12) disposed throughout into an assembly of tire components prior to applying induction heating. The entire tire assembly (2) is then placed in an induction coil which is activated thereby heating the fiber laden component and then after curing or partially curing that component (10, 20, 30, or 40), one finishes the curing of the tire assembly (2) in a conventional mold curing press.

Alternatively, the placing of the preshaped fiber loaded tire component into an assembly (2) of tire components prior to applying induction hearing can include the step of placing the tire assembly (2) in a conventional curing press and curing all the uncured external surfaces of the tire (2) and then placing the tire (2) in an induction coil and applying induction heating to finish cure the preshaped tire component or components (10, 20, 30, or 40). In another method, the preshaped tire components loaded with fibers or metallic particles (12) can be assembled within an assembly of other tire components prior to applying induction heating and then placing the entire tire assembly (2) in a mold curing press and simultaneously providing conductive and induction heating to cure the tire components and the tire assembly in a single curing process.

In a preferred embodiment of the invention, the preshaped component will be premixed with induction sensitive particles (12) such as iron, nickel, oxides of iron, nickel, etc.

When such fibers (12) are loaded into a rubber compound (14) and dispersed through an extrusion process or some other method, as little as a fraction of one percent to five percent of fiber (12) per 100 parts by weight of rubber is needed in order to achieve a high dispersion of induction sensitive material throughout the composition. This minimal amount of fibers (12) enables the component (10, 20, 30, or 40) to be rapidly heated thus permitting the selective curing described above.

BRIEF DESCRIPTION OF DRAWINGS

The invention may take physical form in certain parts and arrangement of parts a preferred embodiment of which will be described in detail in this specification and illustrated in the accompanying drawings which form a part hereof and herein.

BRIEF DESCRIPTION OF THE INVENTION

Figure 1:
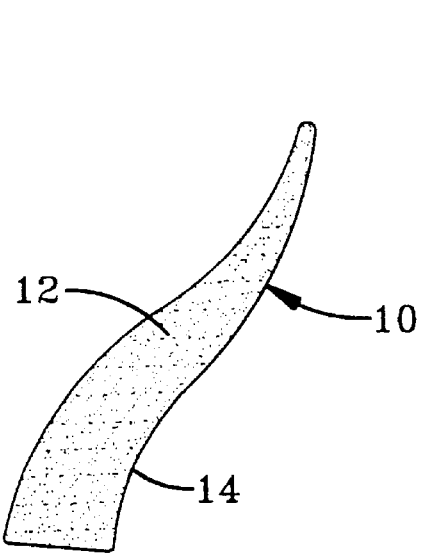
FIG. 1 is a cross-sectional view of an apex tire component (10) preformed of elastomeric material laden with induction sensitive particles or fibers (12).
Figure 2:
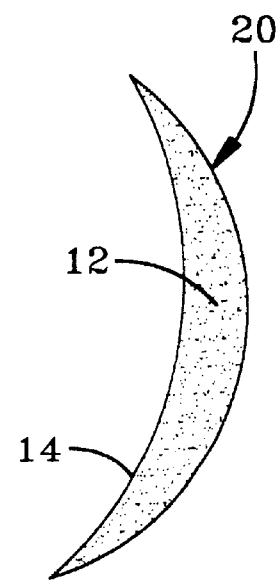
FIG. 2 is a cross-sectional view of a sidewall insert tire component (20) preformed and laden with induction sensitive particles or components.
Figure 3:
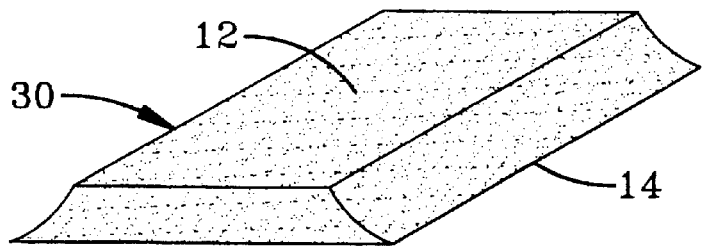
FIG. 3 is a strip of tread rubber (30) laden with induction sensitive particles or fibers (12).
Figure 4:
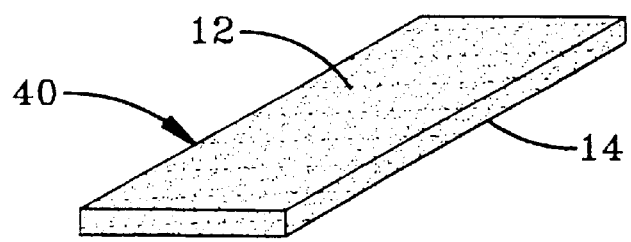
FIG. 4 is a strip of cushion gum rubber tire component (40). The cushion gum rubber is laden with induction sensitive particles or fibers, the cushion gum being used as a component between the tread and a tire casing.

FIGS. 1–4 show various tire components made of elastomeric material laden with induction sensitive particles or fibers (12). The tire components include but are not limited to a rubber apex (10) having a predetermined cross-section, a sidewall insert (20) for runflat tires having a predetermined cross-section, a tread strip (30) and cushion gum layer (40) also having a predetermined cross-section. Each of these components can be provided in strips of unvulcanized rubber. The rubber being laden with induction heat sensitive particles or fibers (12). The preferred method is to premix the induction sensitive particles or fibers (12) in the rubber compound (14) prior to shaping the component (10, 20, 30, 40). It is believed preferable that extrusion should be used to premix the induction sensitive particles (12) and to disperse them throughout the component.

In the tire art the entire rubber product is generally cured by the addition of general heating from a surrounding heat source. There is no control over the amount of heating or the duration of heating that each individual component receives. In this invention, each fiber laden component (10, 20, 30, or 40) can receive a specific amount of heating for a specific duration exclusive of other components. This is possible because when the induction coil is energized the particles heat very rapidly. Therefore, an induction coil can sensitize the particles (12) in various locations of the tire (2) and create a specific amount of heat for a specific duration. These predetermined heating and time exposures can assist in the rapid curing of the tire (2) particularly in the large thick sections of the tire which historically were difficult to cure.

In order to achieve optimum induction heating of the component it is believed preferable to use sensitive materials such as iron, nickel, oxides of iron or nickel or other induction sensitive materials. In experiments when nickel fibers or iron oxide fibers were provided in rather small quantities just a few percent throughout the rubber (14) and placed into an induction coil which is energized the rubber component exhibited an increase in temperature as the coil was activated. This increase in temperature was sufficient to provide a curing affect for the component. This form of heating of the component fundamentally provided an internal rapid heating of the tire component such that internal curing or vulcanization of the tire component could be achieved while maintaining the outer or peripheral surfaces of the component green or substantially uncured. This ability to cure internally a component enables the tire designer to provide a part that otherwise would inhibit rapid conventional curing of a tire.

Once the tire component is premixed with the induction sensitive particles several methods of curing the tire are possible. As noted the component can be partially precured internally prior to placing the component in a tire assembly (2). Then the precured component can be finish cured in a conventional manner. An alternative method is to place the preshaped tire component laden with induction sensitive particles into an assembly (2) of tire components prior to applying induction heating, then placing the tire assembly (2) in a curing press and curing all uncured external surfaces of the tire (2) and then placing the tire (2) in an induction coil and applying induction heating to finish cure the preshaped tire components (10, 20, 30 or 40). Another alternative is to reverse the sequence and place the preshaped component into an assembly of tire components prior to applying to induction heating then placing the tire assembly in an induction coil and applying induction heating and then finish curing the tire assembly (2).

A final alternative is to place the preshaped tire components laden with induction sensitive particles or fibers (12) into an assembly of tire components and then simultaneously apply induction heating and conventional curing to the tire (2). In all of the above cases it is believed that the amount of time for conventional curing is dramatically reduced by the use of induction heating of the internal components.

Figure 5:
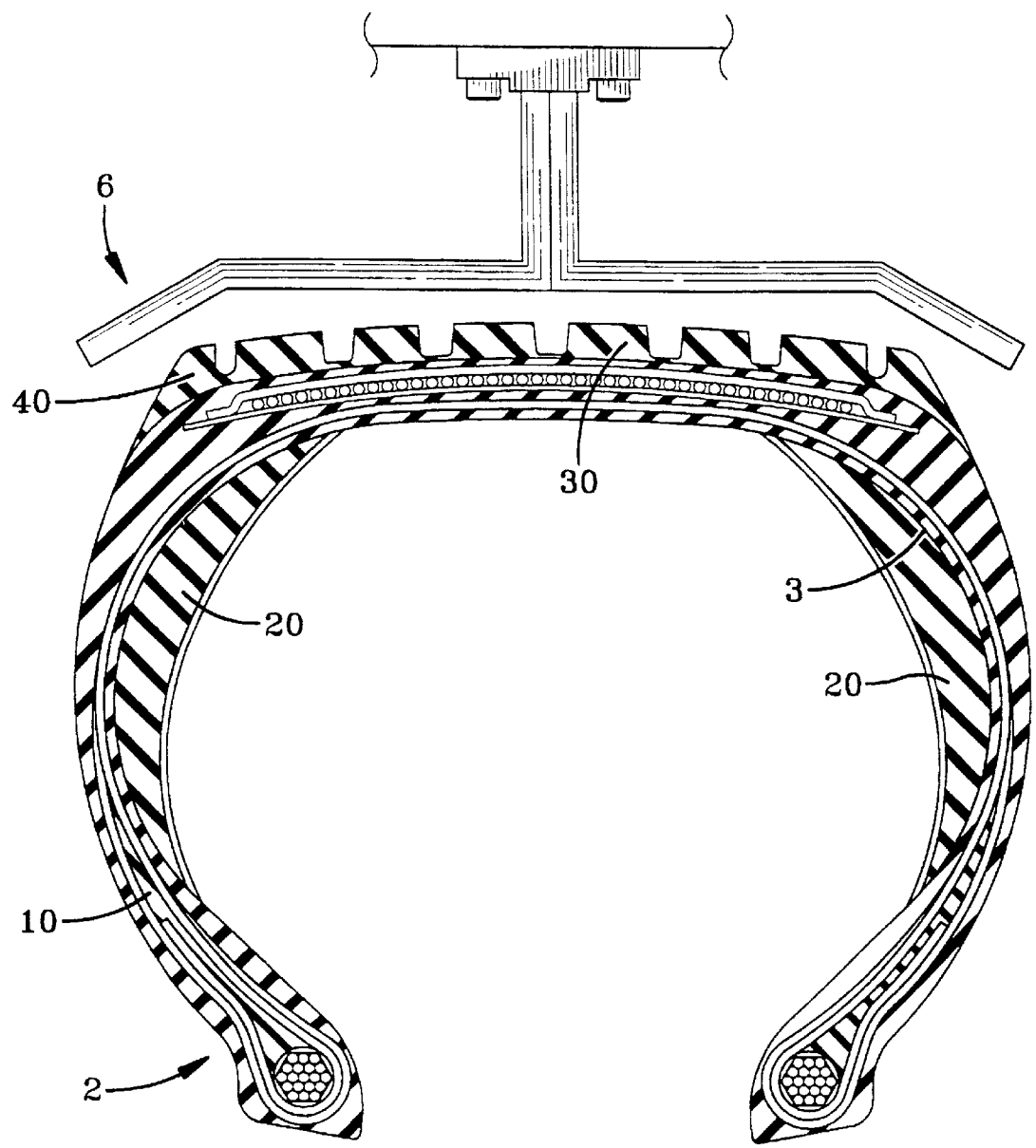
FIG. 5 is a cross-sectional view of a portion of a tire assembly (2) and one embodiment of the electric induction heating means (6) according to the invention.

One of the most beneficial aspects of the use of induction heating can be to prepare a rubber cushion (30) unvulcanized laden with induction sensitive particles that can be placed between the tread (30) of a tire (2) and the casing (3). In this case, as shown in FIG. 5, the tread (30) can be precured and the casing (3) precured. This is very similar to the methods used in retreading commercial truck tires but is equally applicable to new tire production. In such a case the bonding or joining of the tread (30) to the casing (3) is achieved by applying an induction current to the cushion gum (40) exciting the induction sensitive particles to generate a rapid heating of the cushion gum layer which quickly vulcanizes the cushion gum and creates a joint between the tire (2) and the casing (3).

It is believed by using induction heating in this fashion, commercial truck tires can be made or retreaded in a matter of minutes greatly reducing the time to cure the retreaded tire or new tire.

An alternative method to preparing a preshaped cushion gum is provide the cushion gum (40) in an adhesive form which is a liquid coating (40) laden with particles sensitive to induction heating. In such a case a thin coating on the under side of the tread (30) and on the crown of the casing (3) can be applied, the thin coating (40) or adhesive being laden with this induction sensitive particles upon assembly can be placed into an induction coil which is initiated which will then create a joint between the two adhesive layers, thus, bonding the tread (30) and the casing (3).

In all of the above-mentioned methods of preparing an induction laden mixture of unvulcanized rubber and induction sensitive particles or fibers it should be noted that only a small amount of material is needed in the range of a fraction of one percent or two of fibers per 100 parts of rubber. These fibers are sufficiently small to enable the tire designer to implement them into almost any component without degrading the material in terms of its overall performance characteristics. In fact, in many cases the short fibers that are induction sensitive increase the stiffness of the tire component and can be used to help strengthen the component if needed. In those cases higher percentages of induction laden components can be used to enhance the performance of the tire component. It is believed possible to add up to five percent on material when added strength is needed. While as little as 0.01% of induction sensitive particles or fibers per 100 parts of rubber can be employed as noted 5% or less induction sensitive particles or fibers per 100 parts of rubber can be used. While the preferred embodiment discloses the use of a preshaped elastomeric tire component as an intermediate article of manufacture having a rubber composition having a mixture of induction sensitive particles or fibers (12), it is also noted that the material can be unvulcanized elastomeric tire adhesive of a liquid or semi-liquid composition having a rubber mixture having induction sensitive particles or fibers (12). It is also preferred that the induction sensitive particles or fibers (12) be metallic. Most preferably the metallic fibers (12) should be of nickel or iron based material.

As shown in FIG. 5, a cross-sectional view of the entire tire assembly (2) is shown along with an electric induction heating means (6).

Figure 6:
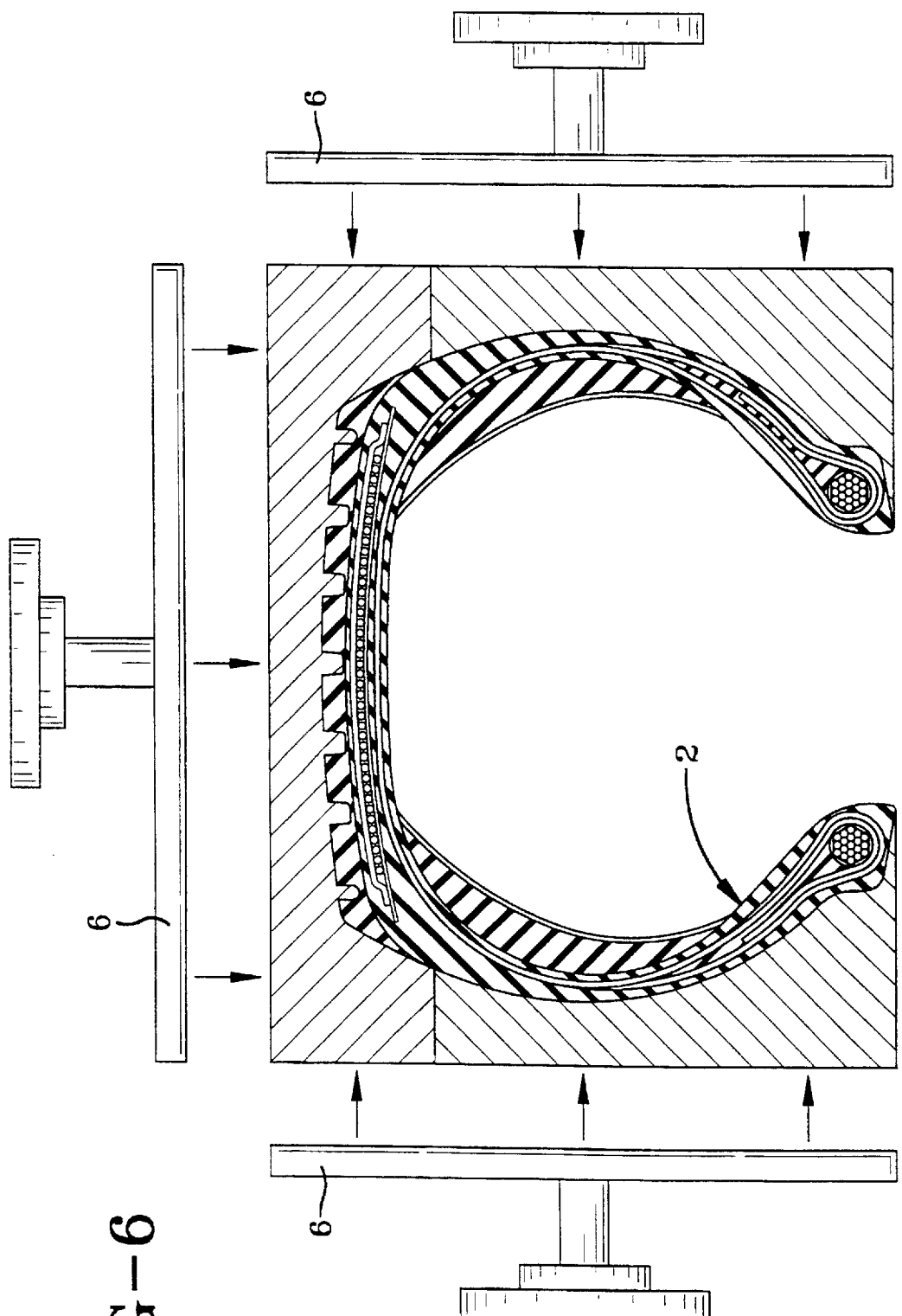
FIG. 6 is a cross-sectional view of a tire assembly (2) placed in a curing mold (8) having a plurality of induction coils (6) placed around the periphery of the tire mold (8).

As further shown in FIG. 6, a cross-section view of the tire assembly (2) in a tire curing mold (5) with a plurality of induction heating coils (6) around the periphery of the mold (5) is shown. Each FIGS. 5 and 6 shows means for accomplishing the desired curing methods described above.

It is understood that the invention can be utilized on almost any tire component but is most preferable in components having a thick cross-section or that are internally buried within the tire. It is also preferable that the tire component can simply be a bonding layer between two tire components such as a tread and tire casing as described above or alternatively can take the form of an adhesive.

What is claimed is:

1. A method of selectively curing a tire component having the steps of:
    dispersing a plurality of induction sensitive metal particles into a rubber composition;
    preshaping the rubber composition into a tire component of a predetermined cross-section;
    placing the tire component, prior to being assembled in a tire, in an induction heating coil and applying induction heating by activating the induction heating coil thereby internally curing the tire component while maintaining the external surfaces of the tire component partially or completely uncured; the tire component when placed in an assembly of tire components has the external surfaces cured in a conventional mold curing press;
    characterized in that the induction sensitive particles are dispensed in the range of 0.01% up to 5% per 100 parts of rubber into the tire component; and
    preselecting a time and energy profile for the induction heating for the tire component to insure the external surfaces remain at least partially uncured while the interior of the tire component is cured.

2. A method of selectively curing a tire component having the steps of:
    dispersing a plurality of induction sensitive short metal fibers into a rubber composition;
    preshaping the rubber composition into a tire component of a predetermined cross-section;
    placing the tire component, prior to being assembled in a tire, in an induction heating coil and applying induction heating by activating the induction heating coil thereby internally curing the tire component while maintaining the external surfaces of the tire component partially or completely uncured; the tire component when placed in an assembly of tire components has the external surfaces cured in a conventional mold curing press;
    characterized in that the induction sensitive short metal fibers are dispensed in the range of a fraction of 1% up to 5% per 100 parts for metal short fibers into the tire component; and
    preselecting a time and energy profile for the induction heating for the tire component to insure the external surfaces remain at least partially uncured while the interior of the tire component is cured.

* * * * *